(12) United States Patent
Kleppner

(10) Patent No.: US 6,227,242 B1
(45) Date of Patent: May 8, 2001

(54) TANK FOR A MOTOR VEHICLE, AND FLANGE FOR SUCH A TANK

(75) Inventor: Stephan Kleppner, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/403,817

(22) PCT Filed: Feb. 25, 1999

(86) PCT No.: PCT/DE99/00508

§ 371 Date: Oct. 26, 2000

§ 102(e) Date: Oct. 26, 1999

(87) PCT Pub. No.: WO99/44852

PCT Pub. Date: Sep. 10, 1999

(30) Foreign Application Priority Data

Mar. 2, 1998 (DE) .............................................. 198 08 719

(51) Int. Cl.⁷ .................................................... F16K 31/12

(52) U.S. Cl. ............... 137/574; 137/565.34; 137/565.17; 123/506; 123/514

(58) Field of Search ............................... 137/574, 565.34, 137/565.17, 576, 565.22; 123/506, 514

(56) References Cited

U.S. PATENT DOCUMENTS 4,664,142 * 5/1987 Bertsch et al. .................. 137/574 X

FOREIGN PATENT DOCUMENTS 44 26 667 A1   2/1996  (DE) .

* cited by examiner

*Primary Examiner*—Kevin Lee
(74) *Attorney, Agent, or Firm*—Michael J. Striker

(57) ABSTRACT

A pressure limiting valve for the fuel return line connected to a tank of a motor vehicle is positioned in a flange which connects the fuel return line to the tank. The pressure limiting valve closes an outlet opening which branches off from a fuel passage of the flange.

10 Claims, 3 Drawing Sheets

TANK FOR A MOTOR VEHICLE, AND FLANGE FOR SUCH A TANK

The present invention relates to a tank for a motor vehicle and to a flange for connecting a fuel return line to a tank of a motor vehicle.

PRIOR ART

From German Patent Disclosure DE-A 44 26 667, a tank for a motor vehicle is known in which excess fuel is returned from and engine via a return line. The return line ends in the tank at a jet pump, which is disposed in the vicinity of the bottom of the tank and serves, with the aid of the returned fuel as a propellant, to feed fuel from a main portion of the tank into an impoundment container disposed in the tank, from this container it is drawn off by a delivery unit and resupplied to the engine. For proper jet pump operation, the pressure of the propellant must be regulated. In the known tank, this is done by means of a branch line, which originates at the jet pump; a spring-loaded ball presses against the end of this branch line that discharges into the impoundment container. If the pressure in the branch line exceeds a predetermined value, the ball is lifted from its seat at the end of the branch line, and fuel flows through the branch line into the impoundment container.

Because of its disposition on the bottom of the impoundment container, the valve is difficult to install and can sometimes be hard to clean. In addition, a certain minimum installation height must be provided, for the sake of proper functioning of the valve.

SUMMARY OF THE INVENTION

The object of the present invention is to optimize the disposition of the pressure limiting valve.

This object is attained according to the invention by a flange as defined by claim 1 and a tank as defined by claim 9.

Mounting the pressure limiting valve on the flange makes it readily accessible for maintenance purposes. The structural height of a tank can also be kept low as a result.

Advantageous features of the flange and tank according to the invention are defined in claims 2–8 and 10 and 11, respectively.

For instance, it is thus possible for a portion of the passage to be aligned with an outlet opening of the branch line, so that through the opening a check valve, such as a duckbill valve, can be disposed in the passage.

If the pressure limiting valve is held detachably in front of the outlet opening, then the check valve is easily accessible via the outlet opening and can be replaced easily as needed.

BRIEF DESCRIPTION OF THE DRAWINGS

Further characteristics and advantages of the invention will become apparent from the ensuing description of an exemplary embodiment in conjunction with the drawings. Shown are.

DETAILED DESCRIPTION OF THE PREFERRED EMBODIMENT

Figure 1:
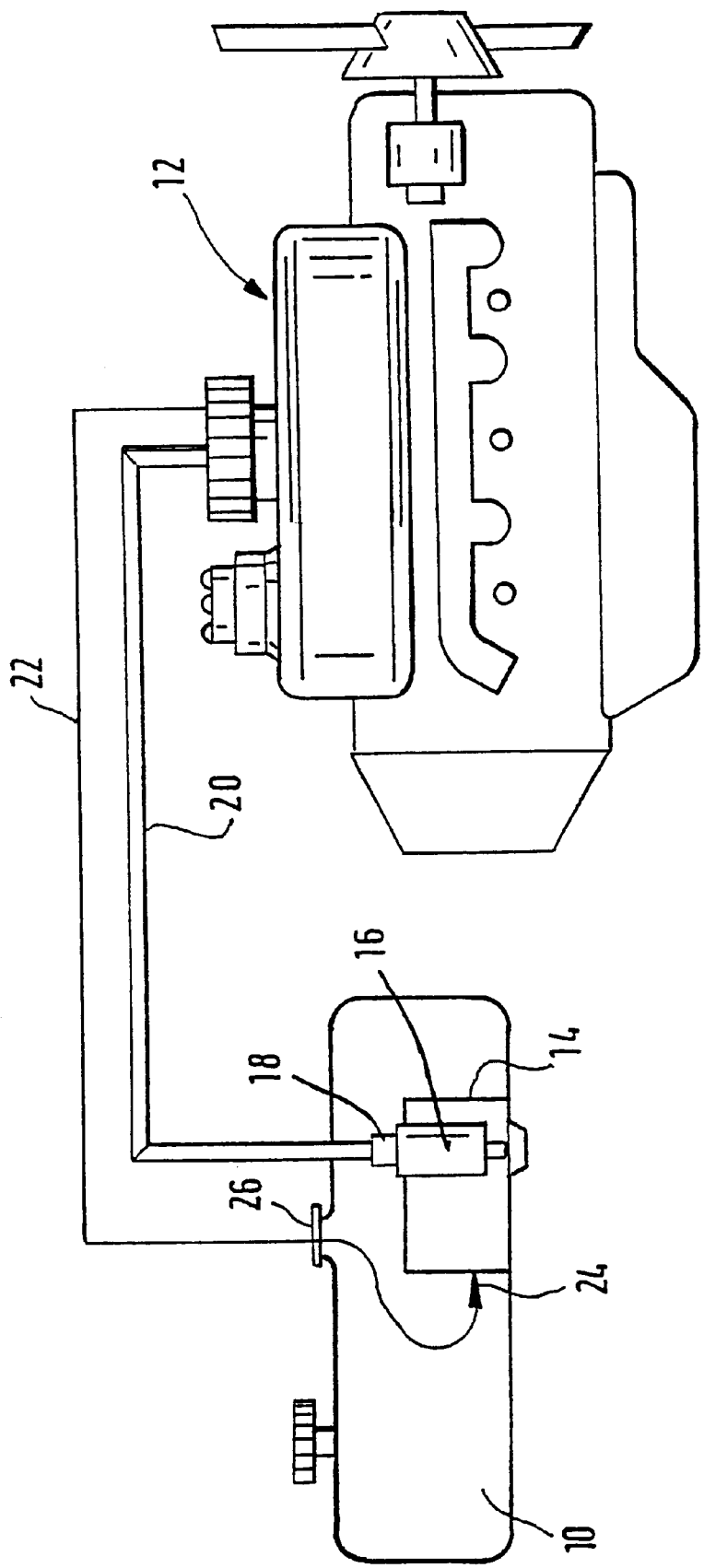
FIG. 1, greatly simplified, a tank of a motor vehicle with a flange according to the invention.

FIG. 1 is a simplified view of a tank 10 of a motor vehicle and of an engine 12 connected to it. An impoundment container 14 is disposed in the tank 10; a fuel delivery unit 16 disposed in the impoundment container 14 aspirates from this container. A pressure line 20 is connected to a pressure neck 18 of the fuel delivery unit 16 and leads to the engine 12. From the engine 12, a return line 22 also leads through a flange 26 in the wall of the tank 10, and through it excess fuel not used by the engine 12 flows back into the tank 10. A jet pump 24 disposed inside the tank 10 communicates with the return line 22 and feeds fuel into the impoundment container 14. During operation of the engine 12, the fuel delivery unit 16 feeds fuel from the impoundment container 14 to the engine 12, and the fuel flowing back through the return line 22 drives the jet pump 24.

Figure 2:
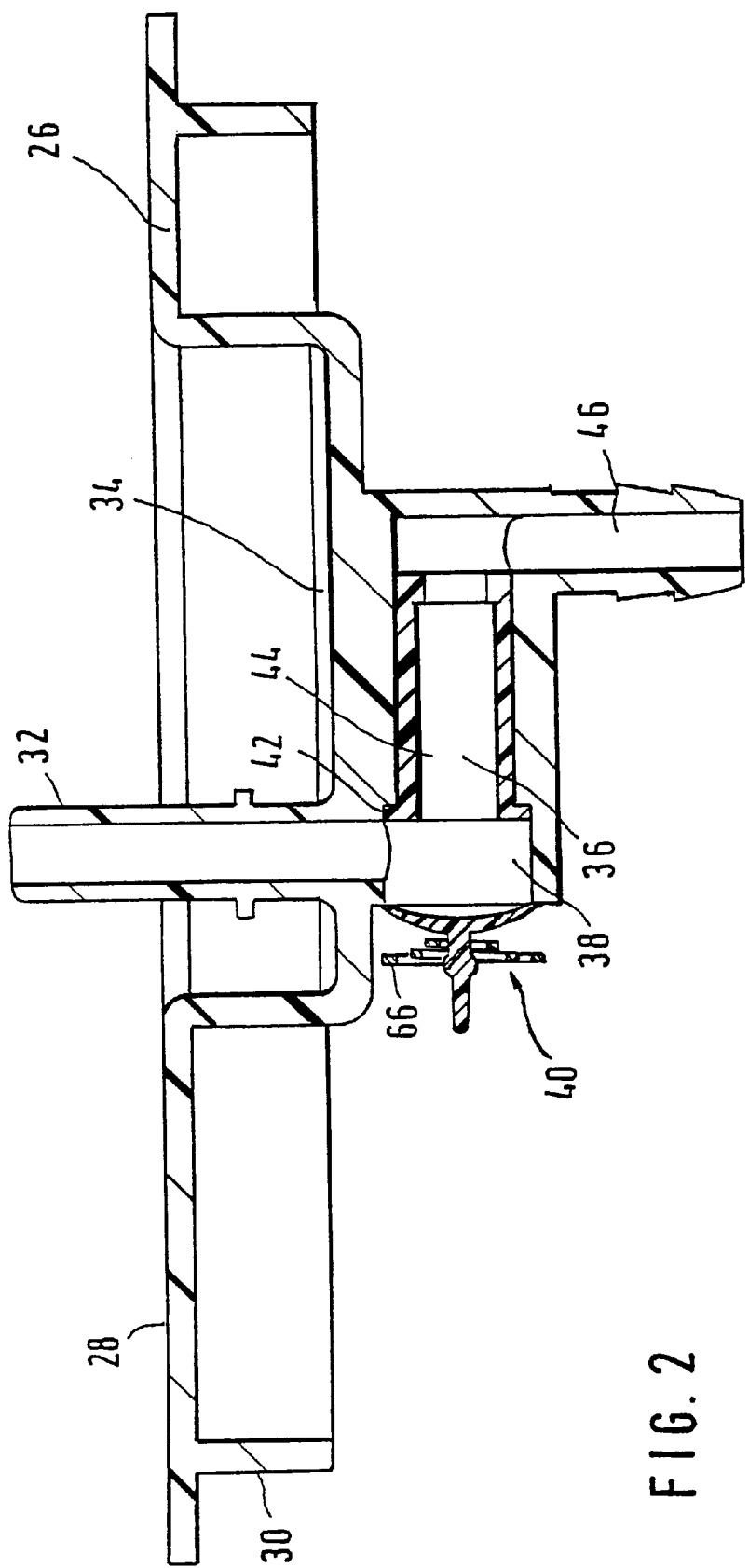
FIG. 2, a section through a flange according to the invention.

FIG. 2 shows a section through the flange 26. It includes a shallow disk 28, with a riblike edge 30 encompassing an underside of the disk 28 that faces toward the tank; this edge is provided for engagement with an opening of the tank, thus defining the position of the flange 26 at the opening.

A fuel passage includes an outer neck 32, provided so that the return line 22 can be secured to it, and also includes a portion 36, extending parallel to the plane of the disk, and an inner neck 46, which is intended for connecting a line to the jet pump.

The portion 36 is disposed on a cufflike feature 34 of the side of the disk 28 facing toward the tank, and it includes two coaxial cylindrical chambers 38 and 44. The height of the cufflike feature 34 is dimensioned such that when the flange is manufactured, for instance by plastic injection molding, a molding tool can be passed in the direction of the axis of the portion 36, so that this feature can be formed without hindrance from the riblike edge 30.

The outer neck 32 is connected to the first chamber 38, and the inner neck 46 is connected to the second chamber 44. The diameter of the second chamber 44 is slightly less than that of the first; the chambers merge with one another at an annular shoulder 42.

The first chamber 38 forms a branch line from the fuel passage, having an outlet opening 39 which occupies a face end, opposite the shoulder, of the first chamber 38. This outlet opening 39 is closed by a pressure limiting valve 40. If desired, the portion 36 can also receive a check valve, such as a duckbill valve 50.

Figure 3:
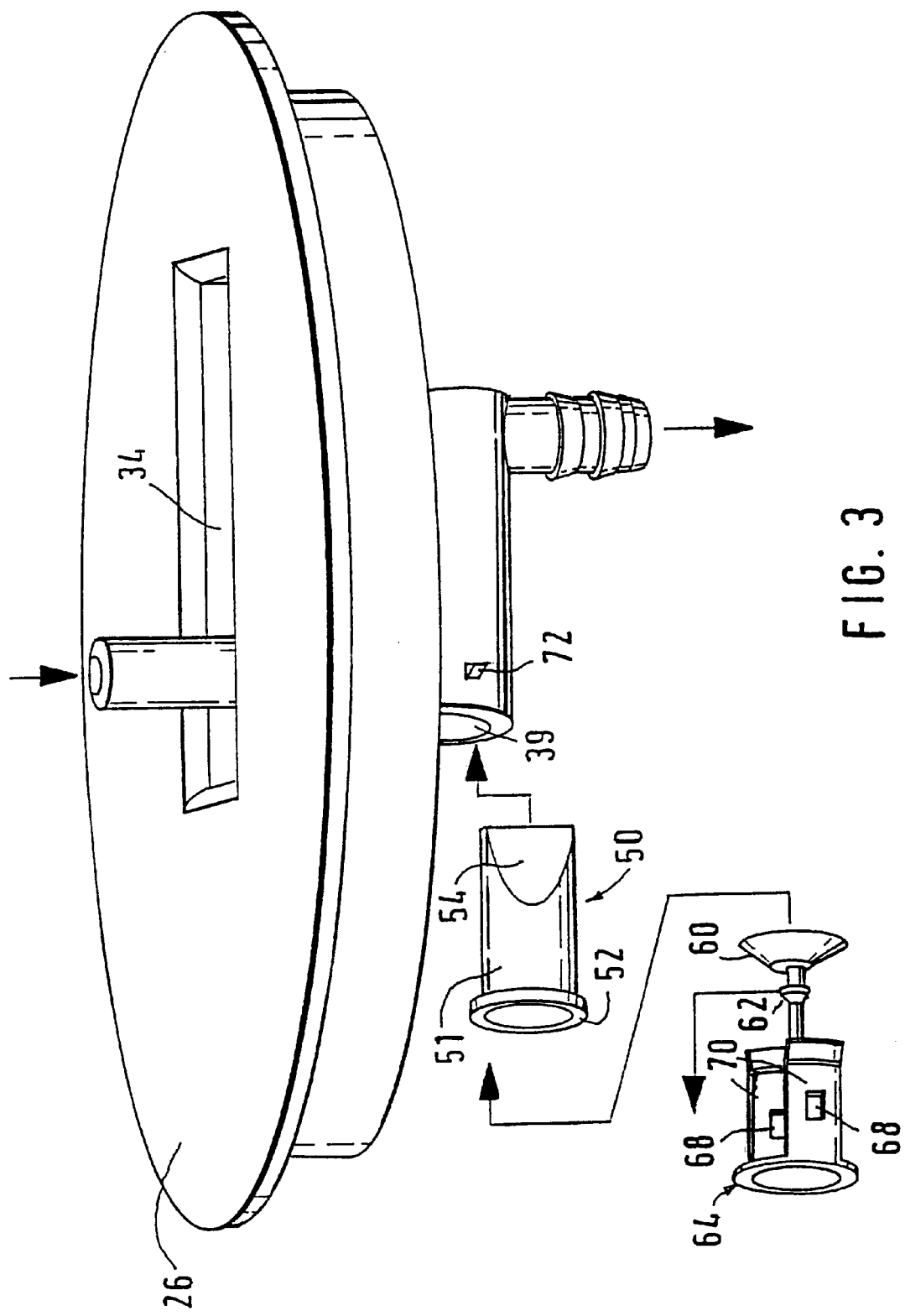
FIG. 3, an exploded view of the flange and its components.

The disposition of the valves 40, 50 in and on the fuel passage can be seen better in FIG. 3. The duckbill valve 50 includes a tubular portion 51, which in a wide-open end has an outward-protruding rim 52 and which is closed on the opposite end, except for a narrow slit, by two plane faces 54 extending obliquely to the axis of the tubular portion 51; of these faces, only one is visible in the drawing. The duckbill valve 50 is introduced through the opening 39 into the portion 36 far enough that the rim 52 rests on the shoulder 42. In this arrangement, fuel returning from the engine can easily flow through this valve, yet this valve still prevents fuel from escaping if because of an accident the pressure at the outer neck 32 of the flange becomes less than inside the tank.

The pressure limiting valve 40 includes a shallow valve shield 60, with a concave side facing toward the opening 39 and with a convex outer side. A mandrel 62 beginning at the convex outer side extends, in the assembled state of the valve (see FIG. 2), through a guide opening in a central portion of a U-shaped flexible metal clamp 64. A shallow spiral spring 66 (see FIG. 2) mounted on the mandrel 62 acts on the valve shield 60 from the central portion of the clamp 64 in the form of the opening 39 and thus presses the edge of the valve shield 60 against a peripheral region of the opening 39 that acts as a valve seat, and thus keeps the opening 39 closed in the state of repose.

With the aid of openings 68 in its legs 70, the clamp 64 can be locked to detent protrusions 72 on an outer wall of the portion 36, and it can be disconnected from this portion by spreading the legs 70 apart.

If the pressure in the portion 36 exceeds a predetermined value, the valve shield 60 is lifted from the edge of the opening 39, counter to the action of the spring 66, and fuel exits through the opening 39. As shown in FIG. 1, the flange 26 is disposed above the impoundment container 14, so that fuel exiting through the valve flow back into the impoundment container 14.

What is claimed is:

1. A flange (26) for connecting a fuel return line (22) to a tank (10) of a motor vehicle, comprising a pressure limiting valve (40) for the fuel return line (22) which is disposed in the flange (26), the pressure limit valve (40) closing an outlet opening (39) that branches off from a fuel passage (32, 36, 46) of the flange (26), wherein a portion (36) of the fuel passage (32, 36, 46) has a cross-section which is not larger than that of the outlet opening (39).

2. The flange of claim 1, wherein the portion (36) of the fuel passage (32, 36, 46) is aligned with the outlet opening (39).

3. The flange of claim 2, wherein the portion (36) of the fuel passage extends in a plane approximately parallel to the plane of the flange (26).

4. The flange of claim 3, and further comprising a check valve (60) which is accommodated in the portion (36) of the fuel passage.

5. The flange of claim 4, wherein the check valve (50) is a duckbill valve.

6. The flange of claim 1, wherein the pressure limiting valve (40) is detachably held in front of the outlet opening (39).

7. The flange of claim 6, and further comprising a flexible U-shaped clamp (64) having legs (70) between which a sealing body (60) of the pressure limiting valve (40) is held, and the legs (70) can be locked on the outside in an area surrounding the outlet opening (39).

8. A tank for a motor vehicle comprising an impoundment container (14), a flange (26) for connecting a fuel return line (22) to the tank (10), and a jet pump (24) which is supplied with returned fuel as its propellant and pumps fuel out of a region of the tank (10) located outside the impoundment container (14) into the impoundment container (14), wherein the flange (26) comprises a pressure limiting valve (40) for the fuel return line (22) which is disposed in the flange (26), the pressure limiting valve (40) closing an outlet opening (39) that branches off from a fuel passage, and wherein a portion (36) of the fuel passage (32, 36, 46) has a cross-section which is not larger than that of the outlet opening (39).

9. The tank of claim 8, wherein the pressure limiting valve (40) is disposed such that the fuel passing therethrough if a predetermined pressure is exceeded flows into the impoundment container (14).

10. The tank of claim 8, wherein the pressure limiting valve (40) is disposed above the impoundment container (14).

* * * * *